(12) United States Patent
Mitsuoka et al.

(10) Patent No.: US 6,429,419 B1
(45) Date of Patent: Aug. 6, 2002

(54) NEAR-FIELD OPTICAL HEAD

(75) Inventors: Yasuyuki Mitsuoka; Norio Chiba; Nobuyuki Kasama; Takashi Niwa; Kunio Nakajima, all of Mihama-ku (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/423,850

(22) PCT Filed: Mar. 12, 1999

(86) PCT No.: PCT/JP99/01213

§ 371 (c)(1),
(2), (4) Date: Mar. 20, 2000

(87) PCT Pub. No.: WO99/49462

PCT Pub. Date: Sep. 30, 1999

(30) Foreign Application Priority Data

Mar. 24, 1998 (JP) .............................................. 10-075417

(51) Int. Cl.⁷ ............................... H01J 3/14; H01J 5/16; H01J 40/14

(52) U.S. Cl. ....................................................... 250/216
(58) Field of Search ...................... 250/216; 369/44.14, 369/44.23, 44.26

(56) References Cited

U.S. PATENT DOCUMENTS 5,703,839 A * 12/1997 Ishii .............................. 369/13
5,715,226 A * 2/1998 Shimano et al. ............ 369/112

\* cited by examiner

Primary Examiner—Robert H. Kim
Assistant Examiner—Courtney Thomas
(74) Attorney, Agent, or Firm—Adams & Wilks

(57) ABSTRACT

A near-field optical head has a tip end having an edge portion defined by two intersecting planes. Information recorded on a recording medium is reproduced in accordance with an intensity of scattered light of an evanescent field generated when the recording medium is illuminated with light and the tip end of the optical head is brought proximate the recording medium at an interval equal to or smaller than a wavelength of light therebetween.

45 Claims, 5 Drawing Sheets

NEAR-FIELD OPTICAL HEAD

BACKGROUND OF THE INVENTION

1. Field of the Invention

The present invention relates to a near-field optical head and, more particularly to a near-field optical head capable of promoting high resolution and enhancing a mechanical strength by devising a structure of a head, facilitating fabrication thereof and realizing high scattering efficiency of an evanescent field.

2. Background Information

At present, there has widely used an information reproducing device of a reproduction exclusive type represented by a CD as well as a CD-ROM. According to the information reproducing device, information recorded on an optical disk is reproduced by using light. For example, in the case of a CD, a surface thereof is recorded with pits each having a size of substantially a wavelength of laser beam used in reproduction and a depth of substantially a quarter of the wavelength as recess and projection information and the interference phenomenon of light is utilized for reproducing the information. When a spot of laser beam is illuminated onto the pit, since the depth of the pit is a quarter of the wavelength, a difference of optical paths of reflected light reflected by a bottom face of the pit and reflected light reflected by the surface becomes a half of the wavelength of the illuminated laser beam. Therefore, the provided reflected light becomes weaker than that in the case of irradiating the spot of laser beam onto a surface at other than the pit. In this way, by detecting the intensity of the reflected light, presence or absence of the pit is determined to thereby achieve reproduction of information recorded on the optical disk.

In a system of irradiating the above-described laser beam and a system of detecting thereof, a lens optical system used in a conventional optical microscope is used, however, the spot size of the laser beam cannot be made equal to or smaller than a half of the wavelength owing to a diffraction limit of light. Meanwhile, in order to increase an information recording density of the optical disk, the size of the pit must be reduced and a track pitch must be narrowed. Accordingly, when an information recording unit is constituted by a size smaller than the wavelength of the laser beam, a conventional information reproducing apparatus cannot be used.

In view of such a problem, in recent years, there has been proposed an optical memory utilizing technologies of a near-field optical microscope. A near-field optical microscope uses a probe having a very small aperture of, for example, a diameter equal to or smaller than the wavelength of illuminated laser beam, for example, about one tenth of the wavelength and observes a very small surface structure and an optical characteristic distribution of a sample by utilizing near-field light (a nonpropagated component in light which exist in a region of optical wavelength or less from a surface of a substance: evanescent field). According to such a near-field optical microscope, by irradiating propagated light from a rear face of the sample, the near-field light is generated at the surface of the sample, the very small aperture of the probe and the surface of the sample are made to proximate to each other to a degree of the diameter of the very small aperture of the probe and the near-field light is scattered at the very small aperture by which the near-field light is taken out from the very small aperture as propagated light. The near-field light generated at the surface of the sample is accompanied by an intensity and a phase reflecting the very small structure and the optical characteristic distribution of the surface of the sample and by processing the taken-out propagated light by an optical detector, observation having a resolution which cannot be realized by a conventional optical microscope is made feasible.

Further, a system of using an AFM cantilever provided with a sharpening treatment at its front end has frequently been used. There have been described technologies of forming a light transmitting tip at a front end of an AFM cantilever in a literature "Hulst et al., Appl. Phys. Lett. (1993) Vol. 62, p461", a literature "Hulst et al., SPIE (1992) Vol. 1639, p36", Japanese Patent Laid-Open No. 160719/1994 and PCT International Application Publication WO95/03561. Further, there have been described technologies of forming an AFM cantilever by a tip which does not transmit light in a literature "Zenhausern et al., Appl. Phys. Lett. (1994) Vol. 65, p1623", a literature "Bachelot et al., Ultramicroscopy (1995) Vol. 61, p111" and Proceedings of Near-field Optics Research Group ("A reflective type near-field optical microscope using a metal probe and observation of a semiconductor sample having a fine structure", Proceedings of the 4th Symposium of Near-field Optics Research Group 1995, p53).

By applying the above-described near-field optical technologies to an optical memory, information can be detected from an optical disk constituted by an information recording unit of a wavelength of laser beam or smaller.

However, according to the above-described method of forming a very small aperture, formation of the very small aperture is difficult and a size capable of forming the aperture is provided with a limit and, accordingly, there poses a problem in which a resolution is difficult to be improved to several tens nm or smaller. Meanwhile, according to the above-described method of using an AFM cantilever, the front end is subjected to the sharpening treatment and therefore, the mechanical strength is weak and there poses a problem in which the reliability is low in using the AFM cantilever as a head. For example, the tip becomes liable to be damaged by the dust on a medium face or vibration of a medium. Further, many steps of a sharpening process are needed in forming the tip and assuming the case of forming the tip at a flying head, there poses a problem in which heights of the flying head and the front end of the tip are difficult to be matched. Further, a surface area of the tip is small and accordingly, there poses a problem in which the scattering efficiency of an evanescent field is lowered.

Hence, the invention has been carried out in view of the above-described drawbacks in the conventional art, and it is an object thereof to provide a near-field optical head capable of improving a resolution and enhancing a mechanical strength, facilitating fabrication thereof and having a high scattering efficiency of an evanescent field.

SUMMARY OF THE INVENTION

According to an aspect of the invention, there is provided a near-field optical head wherein in a near-field optical head for reproducing information recorded on a medium based on an intensity of scattered light of an evanescent field generated when a front end portion of a head is made proximate to the medium at an interval of a distance equal to or smaller than a wavelength of light therebetween and light is illuminated to the medium, the front end portion of the head is formed in a shape of an edge in which two planes intersect with each other.

According to another aspect of the invention, there is provided a near-field optical head wherein in a near-field optical head for reproducing information recorded on a medium based on an intensity of scattered light of an evanescent field generated when a front end portion of a head is made proximate to the medium at an interval of a distance equal to or smaller than a wavelength of light therebetween and light is illuminated to the medium, the front end portion of the head is formed in a shape of an edge in which two planes intersect with each other and a side thereof is microscopically provided with a radius of curvature.

According to another aspect of the invention, there is provided a near-field optical head wherein in a near-field optical head for reproducing information recorded on a medium based on an intensity of scattered light of an evanescent field generated when a front end portion of a head is made proximate to the medium at an interval of a distance equal to or smaller than a wavelength of light therebetween and light is illuminated to the medium, the front end portion of the head is formed in a shape of an edge in which two planes intersect with each other, a side thereof is microscopically provided with a radius of curvature and the radius of curvature becomes infinitive at a section including the side in which the two planes intersect with each other.

According to another aspect of the invention, there is provided a near-field optical head wherein in a near-field optical head for reproducing information recorded on a medium based on an intensity of scattered light of an evanescent field generated when a front end portion of a head is made proximate to the medium at an interval of a distance equal to or smaller than a wavelength of light therebetween and light is illuminated to the medium, the front end portion of the head is formed in a shape of an edge in which at least one of the two intersecting faces is constituted by a curved face and a side where two faces intersect with each other is provided with a radius of curvature in a direction of a diameter of the medium.

Further, according to another aspect of the invention, there is provided a near-field optical head in the above-described near-field optical head, wherein the radius of curvature is set to be equal to or larger than five times as much as the width of a bit of the medium.

Further, according to another aspect of the invention, there is provided a near-field optical head in the above-described near-field optical head, wherein one of the two faces constitutes a bottom face of a slider.

Further, according to another aspect of the invention, there is provided a near-field optical head in the above-described near-field optical head, wherein a light detecting element is arranged at an upper portion of the head.

Further, according to another aspect of the invention, there is provided a near-field optical head in the above-described near-field optical head, wherein a light detecting element is provided at a vicinity of the head in the slider having the head.

Further, according to another aspect of the invention, there is provided a near-field optical head in the above-described near-field optical head, wherein a waveguide path is provided at a vicinity of the head and the light detecting element is provided at the waveguide path in the slider having the head.

Further, according to another aspect of the invention, there is provided a near-field optical head in the above-described near-field optical head, wherein a metal film is provided over the entire or at a portion of the bottom face of the slider and the edge portion is formed by the metal film.

Further, according to another aspect of the invention, there is provided a near-field optical head in the above-described near-field optical head, wherein the slider having the head is constituted by a material having transparency and the light source is arranged on the slider side relative to the medium.

Further, according to another aspect of the invention, there is provided a near-field optical head in the above-described near-field optical head, wherein the slider having the head is constituted by the material having transparency and the light source is provided to the slider.

Further, according to another aspect of the invention, there is provided a near-field optical head in the above-described near-field optical head, wherein the light source and the waveguide path for transmitting light of the light source are provided to the slider having the head.

DETAILED DESCRIPTION OF THE PREFERRED EMBODIMENTS

Figure 1:
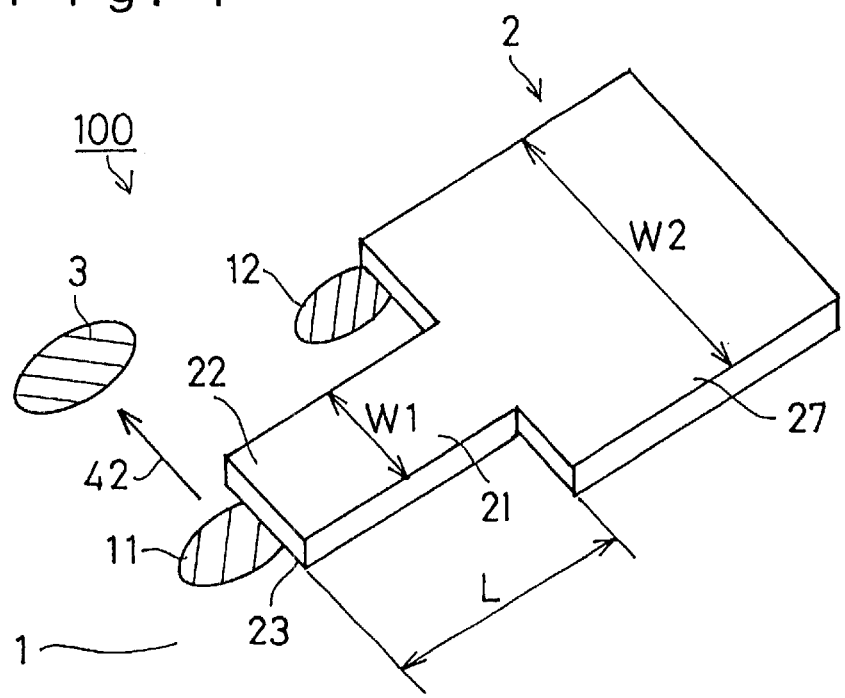
FIG. 1 is an outline perspective view showing a near-field optical head according to Embodiment 1 of the invention.

A detailed explanation will be given of the invention by referring to the drawings as follows. Further, the invention is not limited by the embodiments.

(Embodiment 1)

Figure 2:
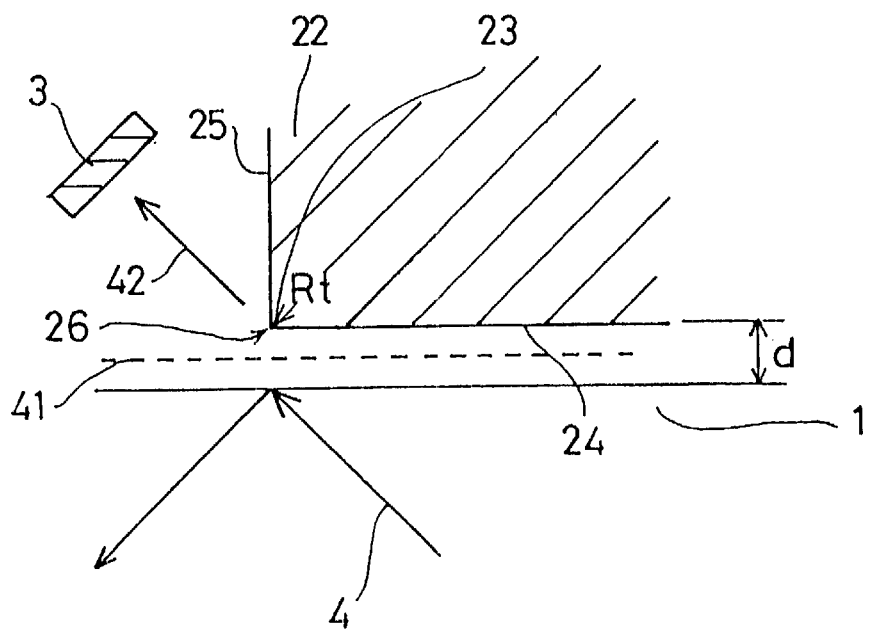
FIG. 2 is an enlarged side view showing a front end portion of the head shown in FIG. 1.

FIG. 1 is an outline perspective view showing a near-field optical head according to Embodiment 1 of the invention. FIG. 2 is an enlarged side view showing a front end portion of the head shown in FIG. 1. The near-field optical head 100 is provided with a constitution including a head 2 in a projected shape disposed opposite to a disk 1 and a light detecting element 3 arranged above a front end portion of the head. The head 2 is provided with a beam portion 21 and a front end portion 22 thereof is formed in an edge shape. An edge portion 23 of the front end portion 22 is constituted by a side 26 where a bottom face 24 and a side face 25 of the head 2 intersect with each other. The bottom face 24 and the side face 25 intersect substantially orthogonally to each other. When the edge portion 23 is viewed microscopically (nm level), the edge portion 23 is provided with a curved face. A radius of curvature Rt thereof and a reproducible bit size correspond with each other and the smaller (sharper) the radius of curvature Rt, the higher density recording can be carried out. The edge portion 23 can be fabricated by an angle determined by crystal faces when it is formed by using anisotropic etching of Si. Further, also in respect of a material other than Si, a considerable sharpness can be realized by accurately setting etching conditions (regardless of wet etching or dry etching).

Further, the edge portion 23 is formed by intersecting two planes and the angle of intersection poses no problem. For example, the edge portion may be formed by intersecting two planes at an angle of 30 degrees or 60 degrees. When a face vertically intersecting with a side produced by the two planes is defined as a section, the edge portion 23 is provided with the same radius of curvature Rt even at any of the section. Meanwhile, when a face including the side produced by the two planes is defined as a section, the radius of curvature is nullified. In contrast thereto, according to the above-described conventional tip, an apex thereof is formed in a semispherical shape when it is microscopically viewed in any of a needle-like shape, a shape of a circular cone and a shape of a pyramid of the tip. Accordingly, when a face including the apex and a center of the spherical body is defined as a section, any of the section is provided with a radius of curvature.

The radius of curvature Rt of the edge portion 23 must be equal to or smaller than the shortest bit length formed on the disk 1. When the radius of curvature Rt of the edge portion 23 is larger than a bit length, presence or absence of a bit 11 can be read with excellent S/N. For example, when the bit length is 100 nm, the radius of curvature Rt of the edge portion 23 must substantially be smaller than about 100 nm.

Next, although a width W1 of the edge portion 23 may be larger than a bit width on the disk 1, the width must not overlap a contiguous one of a track 12. Further, although a wide width portion 27 (width W2) in a projected shape may overlap a contiguous one of the track 12, in that case, a length L of the beam portion 21 may be provided to a degree of preventing cross talk from a contiguous one of the track 12.

Figure 3:
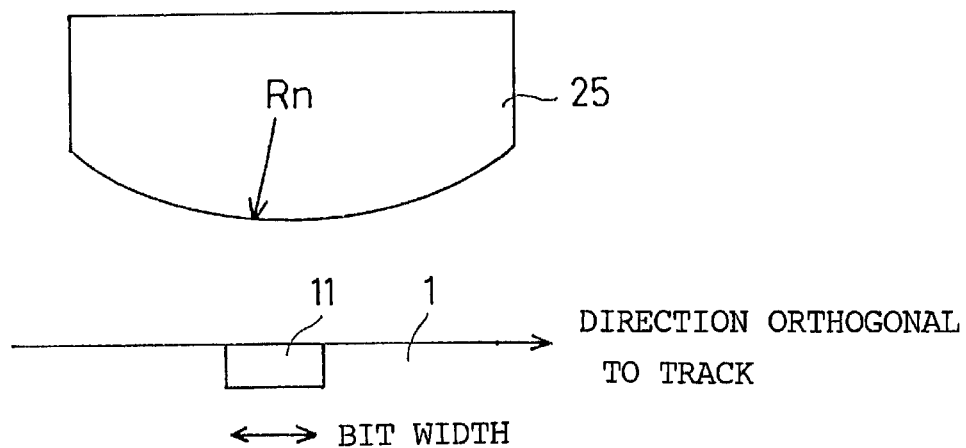
FIG. 3 is an enlarged front view showing the front end portion of the head shown in FIG. 1.

Further, as shown in FIG. 3, the edge portion 23 per se may be provided with a curvature (radius of curvature Rn). In this case, the bottom face 24 is constituted by a curved face and by intersecting the bottom face 24 with the side face 25, the edge portion 23 is formed. Also in such an edge portion 23, a radius of curvature Rt similar to that in FIG. 2 is provided when it is viewed microscopically. The near-field optical head 100 cannot track completely on the bit 11 and accordingly, a deviation in a direction orthogonal to the track is corrected by a feedback control. In this case, when the radius of curvature Rn in the direction orthogonal to the track is to a degree of the bit width, a signal (presence or absence of bit) by the feedback control in the direction orthogonal to the track becomes excessively large to thereby constitute noise and the presence or absence of the bit in the direction of the track cannot be read as a signal. Accordingly, it is preferable to make the noise smaller than the signal of the presence or absence of the bit in the direction of the track by about two orders even when the noise is reduced by a filter from a feedback frequency. Further, in view of the current practical technical level (DVD or the like), the noise level needs to be smaller than the signal level by four orders or more. From the above-described, although the radius of curvature Rn in the direction orthogonal to the track is pertinent to be infinitive, it seems to pose practically no problem when the radius of curvature is about five times as large as the bit width, preferably, fifty times or more as much as the bit width.

Referring back to FIG. 2, a distance d between the edge portion 23 and the disk 1 is controlled to be equal to or smaller than the wavelength of light. In controlling the distance d, a so-to-speak flying head of a hard disk drive (HDD) is used and the near-field optical head 100 is flown by air film lubrication. When the fly head technology is used, a flow path in a shape of a wedge film needs to be formed by installing a tapered face at the near-field optical head 100. According to the fly head technology, the distance d can be controlled at around 50 nm. Further, as in the case of an AFM cantilever, the distance may be detected and a feedback control may be carried out by a piezoelectric element or the like. Further, the control may be realized by bringing about a contact state interposing a thin lubrication film (oil or water or the like) of about several nm therebetween or a complete contact state may be brought about.

When light 4 is illuminated by an incident angle satisfying a total reflection condition from a light source (illustration is omitted) to a rear face of the disk 1, an evanescent field 41 is generated at the surface of the disk. By inserting the edge portion 23 thereinto, scattered light 42 is generated. The optical intensity of the scattered light 42 is changed by presence or absence of the bit 11. The generated scattered light 42 is received by the light detecting element 3. The light detecting element 3 carries out photoelectric conversion in accordance with the optical intensity of the scattered light 42. Thereby, information on the disk 1 can be reproduced.

Figure 4:
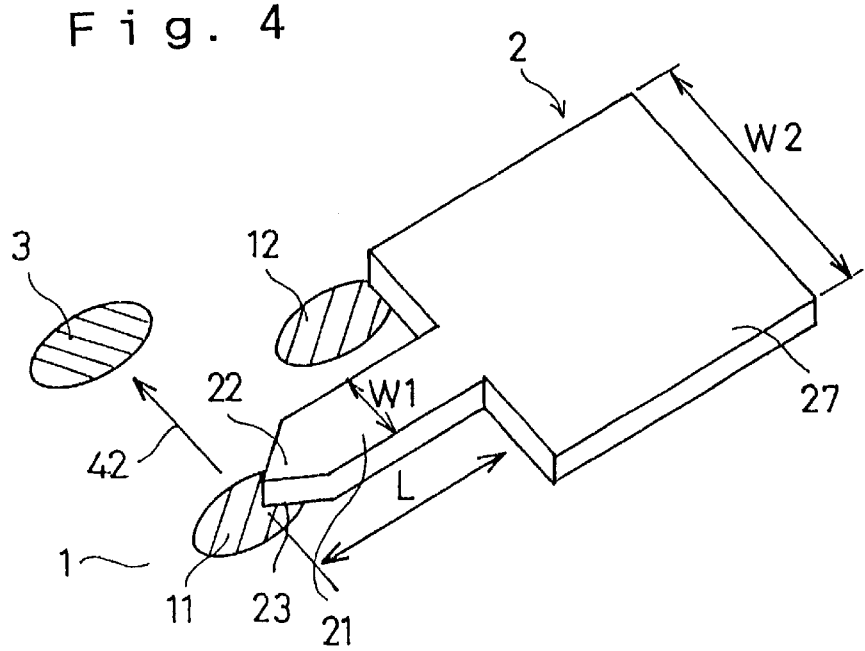
FIG. 4 is an outline perspective view showing a modified example of the near-field optical head shown in FIG. 1.
Figure 5:
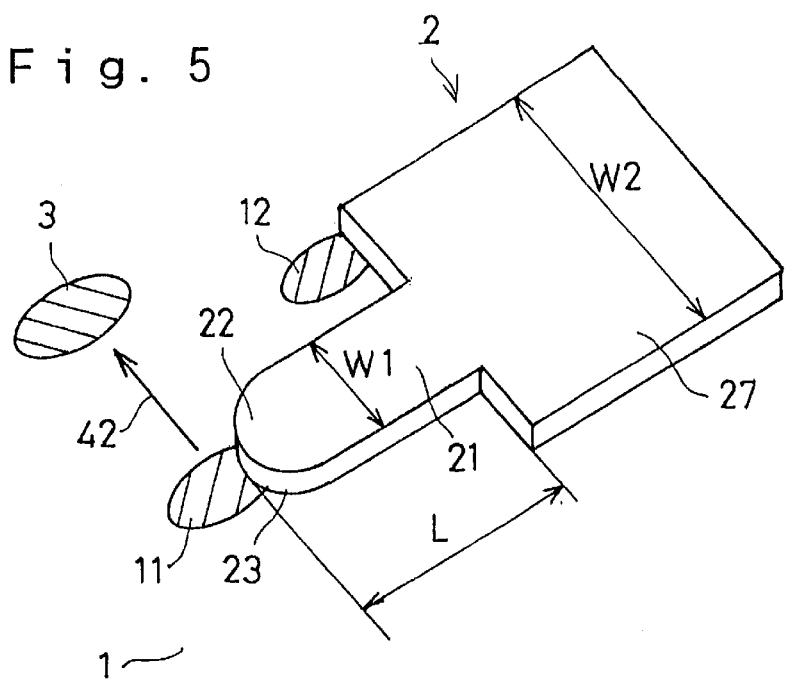
FIG. 5 is an outline perspective view showing a modified example of the near-field optical head shown in FIG. 1.

Further, the front end portion 22 of the head may be formed in a shape of a sword as shown in FIG. 4 other than a shape of a short strip as shown in FIG. 1. Further, it may be formed in a circular shape as shown in FIG. 5. Further, in respect of a state of recording onto the disk 1, the bit may be recorded by using a difference in transmittance or reflectance or may be recorded as recess and projection. Further, the near-field light includes far field light.

As mentioned above, according to the near-field optical head 100, in comparison with the conventional tip subjected to a sharpening treatment, the edge portion 23 is enhanced in the mechanical strength and, accordingly, reliability of the near-field optical head is achieved. Next, in forming the tip, many steps of a sharpening process are needed, further, matching of heights of the front end of the tip and a slider is difficult in view of fabrication. In contrast thereto, the edge portion 23 can be formed comparatively easily at a portion of a support mechanism head slider by an etching treatment and the matching of heights of the edge portion 23 and a bottom face of the slider is dispensed with. Further, an area of scattering the evanescent field 41 of the edge portion 23 is larger than that of the tip and accordingly, the provided intensity of scattered light is made stronger.

(Embodiment 2)

Figure 6:
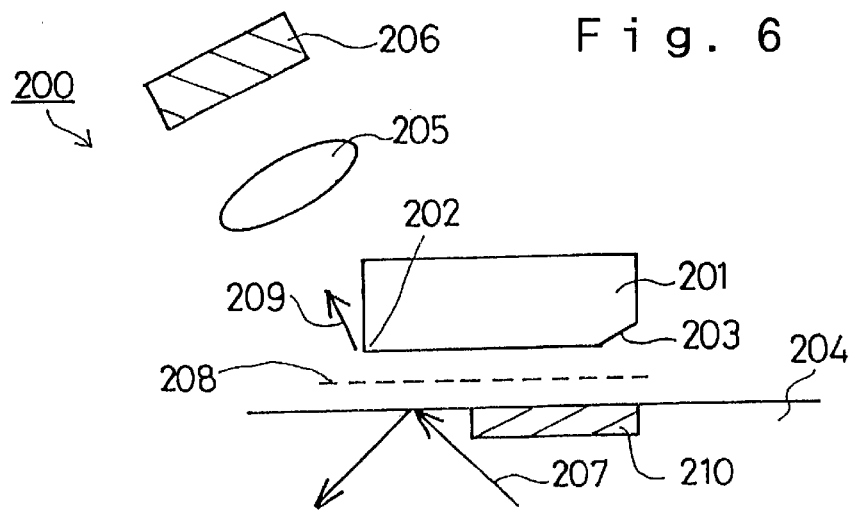
FIG. 6 is an outline constitution view showing a structure of a near-field optical head according to Embodiment 2 of the invention.

FIG. 6 is an outline constitution view showing a structure of a near-field optical head according to Embodiment 2 of the invention. The near-field optical head 200 is constructed by a constitution which is more specific than that of the near-field optical head 100 according to Embodiment 1, mentioned above. According to the near-field optical head 200, an edge portion 202 similar to the above-described (refer to FIG. 2) is formed at a bottom face of a head slider 201. A tapered face 203 is provided on a side thereof opposed to the edge portion 202. A flow path in a shape of a wedge film is produced by the tapered face 203 and a disk 204. Further, formation of the edge portion 202 is carried out by an etching treatment. The near-field optical head 200 is supported by a suspension arm (illustration is omitted) and is driven by a voice coil motor (illustration is omitted). Further, a lens 205 for condensing scattered light and a light detecting element 206 are arranged in a skewed upper direction of the head slider 201.

When light 207 is illuminated from a light source (illustration is omitted) to a rear face of the disk 204 by an incident angle satisfying the total reflection condition, an evanescent field 208 is generated at the surface of the disk. The head slider 201 is flown obliquely and accordingly, the edge portion 202 approaches the face of the disk and scatters light. The optical intensity of scattered light 209 is changed by presence or absence of a bit 210. The generated scattered light 209 is condensed by the lens 205. The light detecting element 206 is arranged at a condensing destination and the scattered light 209 is received by the light detecting element 206. The light detecting element 206 carries out photoelectric conversion in accordance with the optical intensity of the scattered light 209. Thereby, information on the disk 204 is reproduced.

According to the near-field optical head 200, by carrying out the flying-head technology, the distance between the edge portion 202 and the disk 204 can easily be controlled. Further, only the edge portion 202 is formed at the head slider 201 and accordingly, the near-field optical head 200 is more compact than a general magnetic head and the cost becomes lower.

(Embodiment 3)

Figure 7:
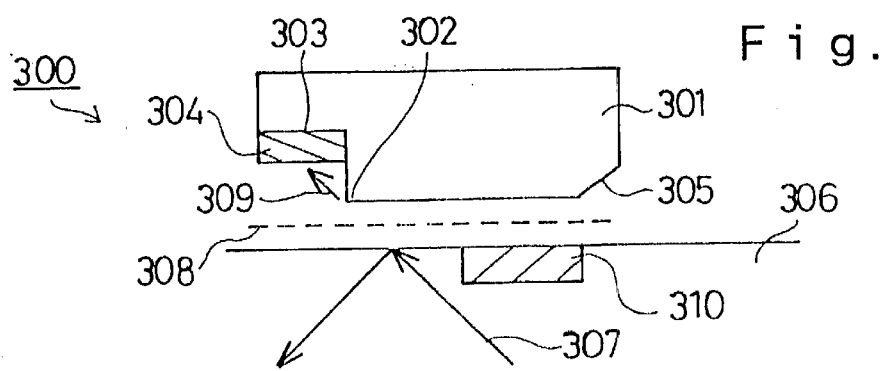
FIG. 7 is an outline constitution view showing a structure of a near-field optical head according to Embodiment 3 of the invention.

FIG. 7 is an outline constitution view showing a structure of a near-field optical head according to Embodiment 3 of the invention. The near-field optical head 300 is constructed by a constitution which is more specific than that of the near-field optical head 100 according to Embodiment 1 mentioned above. According to the near-field optical head 300, an edge portion 302 similar to the above-described (refer to FIG. 2) is formed at a bottom face of a head slider 301. Further, a stepped portion 303 is formed at a vicinity of the edge portion 302 in the head slider 301. A light detecting element 304 is provided at the stepped portion 303. A tapered face 305 is provided on the side thereof opposed to the edge portion 302. A flow path in a shape of a wedge film is produced by the tapered face 305 and a disk 306. Further, formation of the edge portion 302 is carried out by an etching treatment. The near-field optical head 300 is supported by a suspension arm (illustration is omitted) and is driven by a voice coil motor (illustration is omitted).

When light 307 is illuminated from a light source (illustration is omitted) to a rear face of the disk 306 at an incident angle satisfying the total reflection condition, an evanescent field 308 is generated at a surface of the disk. The head slider 301 is flown obliquely and therefore, the edge portion 302 approaches the face of the disk and scatters light. The optical intensity of scattered light 309 is changed by presence or absence of a bit 310. The generated scattered light 309 is received by the light detecting element 304 provided at a vicinity of the edge portion 302 in the head slider 301. The light detecting element 304 carries out photoelectric conversion in accordance with the optical intensity of the scattered light 309. Thereby, information on the disk 306 is reproduced.

According to the near-field optical head 300, the light detecting element 304 is provided directly in the head slider 301 and accordingly, the head becomes compact. Further, by providing the light detecting element 304 at the vicinity of the edge portion 302, the light detecting efficiency is improved.

(Embodiment 4)

Figure 8:
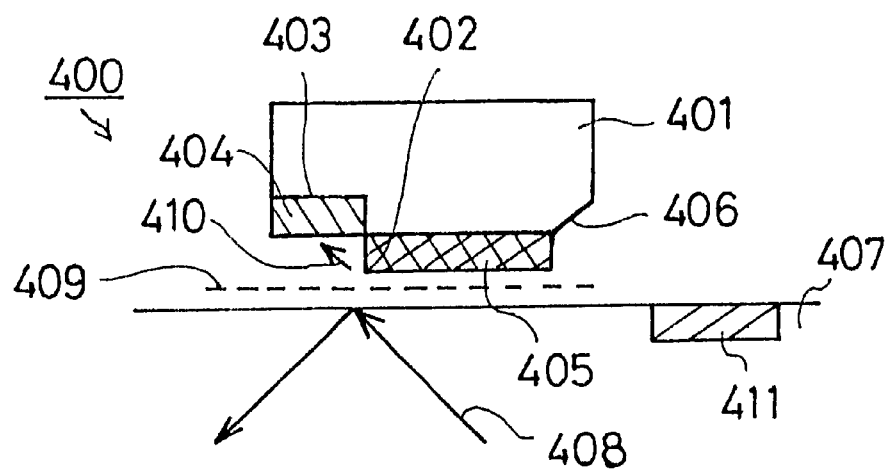
FIG. 8 is an outline constitution view showing a structure of a near-field optical head according to Embodiment 4 of the invention.

FIG. 8 is an outline constitution view showing a structure of a near-field optical head according to Embodiment 4 of the invention. The near-field optical head 400 is constructed by a constitution which is more specific than that of the near-field optical head 100 according to Embodiment 1, mentioned above. An edge portion 402 similar to the above-described (refer to FIG. 2) is formed at a bottom face of a head slider 401. Further, a stepped portion 403 is formed at a vicinity of the edge portion 402 in the head slider 401. A light detecting element 404 is provided at the stepped portion 403. Further, a metal film 405 is formed at a bottom face of the head slider 401. The edge portion 402 is formed by the metal film 405. Because the scattering efficiency of a metal edge is higher than that of an edge of a dielectric member. Further, the metal film may be formed not over the entire bottom face of the head slider 401 but only at the edge portion 402. A tapered face 406 is provided on a side thereof opposed to the edge portion 402. A flow path in a shape of a wedge film is produced by the tapered face 406 and a disk 407. Further, formation of the edge portion 402 is carried out by an etching treatment. The near-field optical head 400 is supported by a suspension arm (illustration is omitted) and is driven by a voice coil motor (illustration is omitted).

At a portion where the head slider 401 is not present, light 408 is incident on the disk 407 by the total reflection condition and therefore, all thereof is reflected. At a portion where the head slider 401 is present (other than edge portion) with a distance equal to or smaller than the wavelength from the disk 407, a distance between the head slider 401 and the disk 407 is substantially equal to null and accordingly, the light 408 penetrates the surface of the disk. Transmitted light (illustration is omitted) is reflected by the metal film 405 at the bottom face of the head slider 401. Or, when the metal film 405 is formed partially, light is reflected by a portion with the metal film 405. In this way, by reflecting light by forming the metal film 405 at the bottom face of the head slider 401, stray light entering the light detecting element 404 is reduced. Further, not the reflecting film but an absorbing film may be formed. However, it is not preferable to form the edge portion 402 by an absorbing film.

The principle of reproducing information is the same as that in Embodiment 3. That is, the edge portion 402 of the flown head slider 401 is made to enter an evanescent field 409 at the surface of the disk to thereby scatter light. The optical intensity of the scattered light 410 is changed by presence or absence of a bit 411. The generated scattered light 410 is received by the light detecting element 404 provided at a vicinity of the edge portion 402 in the head slider 401. The light detecting element 404 carries out photoelectric conversion in accordance with the optical intensity of the scattered light 410. Thereby, information on the disk 407 is reproduced.

(Embodiment 5)

Figure 9:
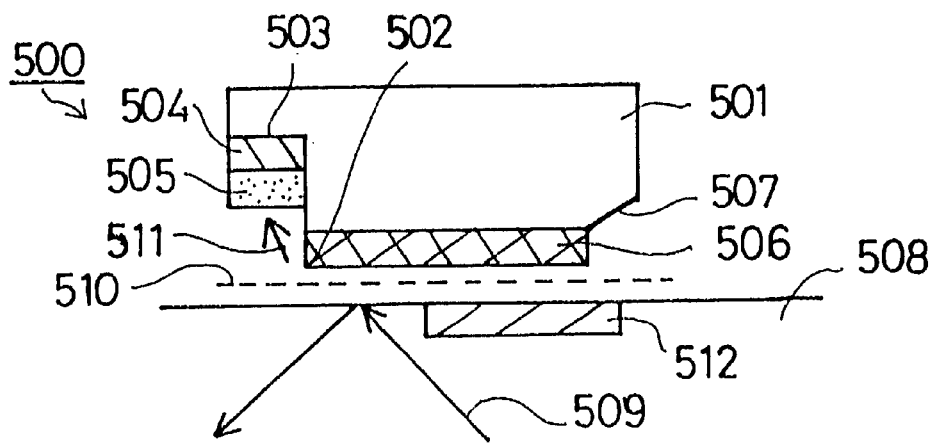
FIG. 9 is an outline constitution view showing a structure of a near-field optical head according to Embodiment 5 of the invention.

FIG. 9 is an outline constitution view showing a structure of a near-field optical head according to Embodiment 5 of the invention. The near-field optical head 500 is constructed by a constitution substantially the same as the near-field optical head 400 according to Embodiment 4, mentioned above, and differs therefrom in that a waveguide path is formed at the light detecting element. According to the near-field optical head 500, an edge portion 502 similar to the above-described (refer to FIG. 2) is formed at a bottom face of a head slider 501. A stepped portion 503 is formed at a vicinity of the edge portion 502 in the head slider 501. A light detecting element 504 and a waveguide path 505 are provided at the stepped portion 503. A metal film 506 is formed at a bottom face of the head slider 501. The edge portion 502 is formed by the metal film 506. Because the scattering efficiency of a metal edge is higher than that of an edge of a dielectric member. Further, the metal film 506 may be formed not over the entire bottom face of the head slider 501 but only at the edge portion 502. A tapered face 507 is provided on a side thereof opposed to the edge portion 502. A flow path in a shape of a wedge film is produced by the tapered face 507 and a disk 508. Further, formation of the edge portion 502 is carried out by an etching treatment. The near-field optical head 500 is supported by a suspension arm (illustration is omitted) and is driven by a voice coil motor (illustration is omitted).

When light 509 is illuminated from a light source (illustration is omitted) to a rear face of the disk 508 at an incident angle satisfying the total reflection condition, an evanescent field 510 is generated at a surface of the disk. The head slider 501 is obliquely flown and accordingly, the edge portion 502 approaches the face of the disk and scatters light. The optical intensity of scattered light 511 is changed by presence or absence of a bit 512. The generated scattered light 511 is received by the light detecting element 504 after having passed through the waveguide path 505 provided at a vicinity of the edge portion 502 in the head slider 501. The light detecting element 504 carries out photoelectric conversion in accordance with the optical intensity of the scattered light 511. Thereby, information on the disk 508 is reproduced.

According to the near-field optical head 500, the waveguide path 505 is formed on the light detecting element 504 and accordingly, the scattered light 511 from the edge portion 502 can selectively be guided to the light detecting element 504. Accordingly, other scattered light does not enter the light detecting element 504 and therefore, an S/N ratio is promoted. Further, a lens may be provided at a front end of the waveguide path 505. Further, the light detecting element 504 is directly provided at the head slider 501 and accordingly, the head becomes compact. Further, by providing the light detecting element 504 at the vicinity of the edge portion 502, the light detecting efficiency is improved. Further, light which has transmitted through the surface of the disk is reflected by the metal film 506 formed at the bottom face of the head slider 501. Therefore, stray light entering the waveguide path 505 is reduced. In addition, scattered light produced by small defect, recess and protrusion or the like other than the bit on the disk 508 or light which has transmitted through the head slider 501 or the like constitutes stray light, however, the waveguide path 505 is provided and accordingly, influence of these stray light is difficult to be effected.

(Embodiment 6)

Figure 10:
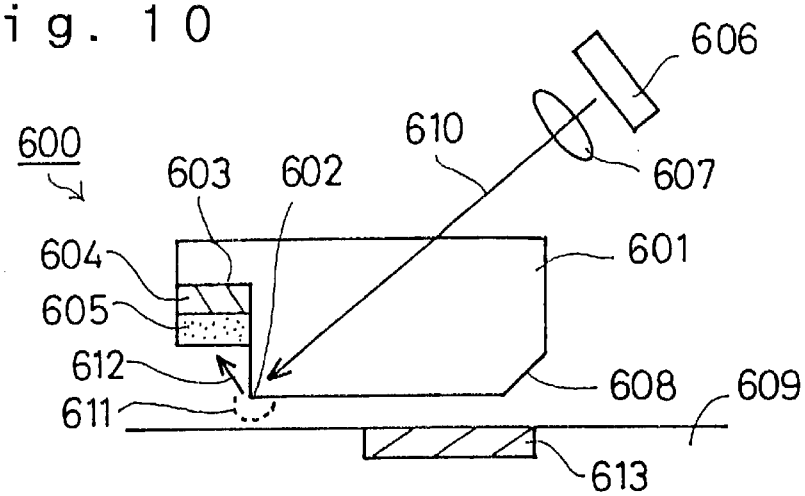
FIG. 10 is an outline constitution view showing a structure of a near-field optical head according to Embodiment 6 of the invention.

FIG. 10 is an outline constitution view showing a structure of a near-field optical head according to Embodiment 6 of the invention. The near-field optical head 600 is constituted not by a system of totally reflecting light at a surface of a disk but by a system of irradiating light from above a head slider. According to the near-field head slider 600, a head slider 601 is constituted by a material having transparency and an edge portion 602 similar to the above-described (refer to FIG. 2) is formed at a bottom face of the head slider 601. Further, a stepped portion 603 is formed at a vicinity of the edge portion 602 in the head slider 601. The stepped portion 603 is provided with a light detecting element 604 and a waveguide path 605. A light source 606 and a lens 607 are arranged on an oblique upper side of the head slider 601. A tapered face 608 is provided on a side thereof opposed to the edge portion 602. A flow path in a shape of a wedge film is produced by the tapered face 608 and a disk 609. Further, formation of the edge portion 602 is carried out by an etching treatment. The near-field optical head 600 is supported by a suspension arm (illustration is omitted) and is driven by a voice coil motor (illustration is omitted).

Light 610 from the light source 606 is condensed by the lens 607 and illuminates the edge portion 602 after having passed through the head slider 601. Accordingly, an evanescent field 611 is generated at a surface of the edge portion 602. The head slider 601 is flown obliquely and accordingly, the edge portion 602 approaches a face of the disk and scatters light. The optical intensity of the scattered light 612 is changed by presence or absence of a bit 613. Generated scattered light 612 is received by the light detecting element 604 after having passed through the waveguide path 605 provided at a vicinity of the edge portion 602 in the head slider 601. The light detecting element 604 carries out photoelectric conversion in accordance with the optical intensity of the scattered light 612. Accordingly, information on the disk 609 is reproduced. According to the near-field optical head 600, the light source 606 is arranged on the same side with the head and therefore, the apparatus can be made compact.

(Embodiment 7)

Figure 11:
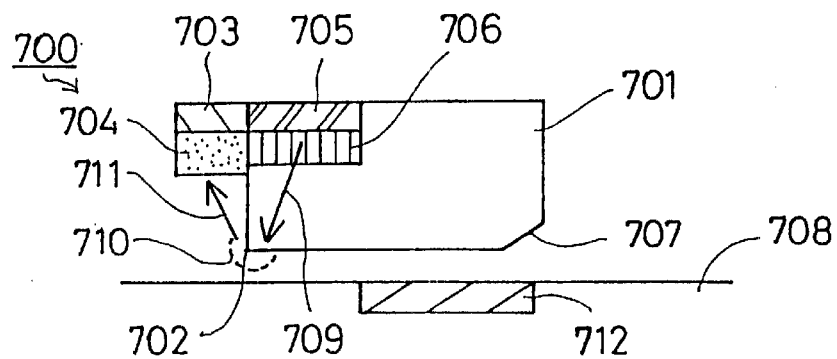
FIG. 11 is an outline constitution view showing a structure of a near-field optical head according to Embodiment 7 of the invention.

FIG. 11 is an outline constitution view showing a structure of a near-field optical head according to Embodiment 7 of the invention. According to the near-field optical head 700, a head slider 701 is constituted by a material having transparency and an edge portion 702 similar to the above-described (refer to FIG. 2) is formed at a bottom face of the head slider 701. Further, a light detecting element 703 and a waveguide path 704 are provided at a vicinity of the edge portion 702 in the head slider 701. A light source 705 and a lens 706 are integrated to the head slider 701. A tapered face 707 is provided at a side thereof opposed to the edge portion 702. A flow path in a shape of a wedge film is produced by the tapered face 707 and a disk 708. Further, formation of the edge portion 702 is carried out by an etching treatment. The near-field optical head 700 is supported by a suspension arm (illustration is omitted) and is driven by a voice coil motor (illustration is omitted).

Light 709 from the light source 705 is condensed by the lens 706 and illuminates the edge portion 702 after having transmitted through the head slider 701. Thereby, an evanescent field 710 is generated at a surface of the edge portion 702. The head slider 701 is flown obliquely and accordingly, the edge portion 702 approaches a face of the disk and scatters light. The optical intensity of scattered light 711 is changed by presence or absence of a bit 712. The generated scattered light 711 is received by the light detecting element 703 after having passed through the waveguide path 704 provided at the vicinity of the edge portion 702 in the head slider 701. The light detecting element 703 carries out photoelectric conversion in accordance with the optical intensity of the scattered light 711. Accordingly, information on the disk 708 is reproduced. According to the near-field optical head 700, the light source 705 and the lens 706 are integrated to the head slider 701 and therefore, the constitution becomes compact. Further, the constitution is suitable for mass production.

(Embodiment 8)

Figure 12:
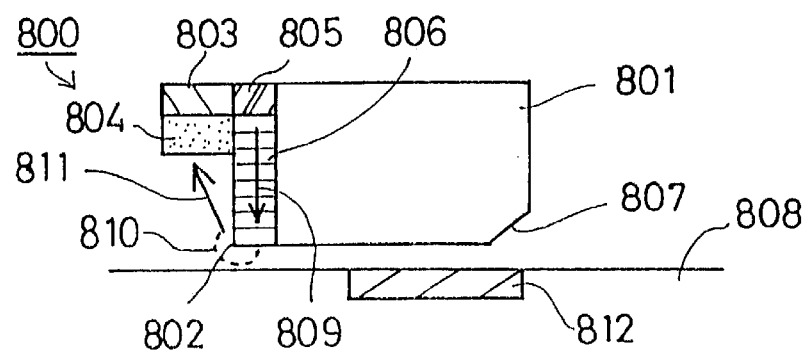
FIG. 12 is an outline constitution view showing a structure of a near-field optical head according to Embodiment 8 of the invention.

FIG. 12 is an outline constitution view showing a structure of a near-field optical head according to Embodiment 8 of the invention. According to the near-field optical head 800, an edge portion 802 similar to the above-described (refer to FIG. 2) is formed at a bottom face of a head slider 801. Further, a light detecting element 803 and a waveguide path 804 are provided at a vicinity of the edge portion 802 in the head slider 801. Further, a light source 805 and a waveguide path 806 are integrated to the head slider 801. A tapered face 807 is provided at a side thereof opposed to the edge portion 802. A flow path in a shape of a wedge film is produced by the tapered face 807 and a disk 808. Further, formation of the edge portion 802 is carried out by an etching treatment. The near-field optical head 800 is supported by a suspension arm (illustration is omitted) and is driven by a voice coil motor (illustration is omitted).

Light 809 from the light source 805 illuminates the edge potion 802 after having passed through the waveguide path 806. Accordingly, an evanescent field 810 is generated at a surface of the edge portion 802. The head slider 801 is flown obliquely and accordingly, the edge portion 802 approaches a face of the disk and scatters light. The optical intensity of scattered light 811 is changed by presence or absence of a bit 812. The generated scattered light 811 is received by the light detecting element 803 after having passed through the waveguide path 804 provided at the vicinity of the edge portion 802 in the head slider 801. The light detecting element 803 carries out photoelectric conversion in accordance with the optical intensity of the scattered light 811. Thereby, information on the disk 808 is reproduced. According to the near-field optical head 800, only the edge portion 802 can be illuminated by the waveguide path 806 and therefore, stray light entering the light detecting element 803 can be reduced. Further, the light source 805 is integrated to the head slider 801 and therefore, the constitution becomes compact. Further, the constitution is suitable for mass production. Further, a lens may be arranged in front of the guide path 806.

Further, although according to the above-described embodiments, an explanation has been given of various means, members as well as structures in a limited way, they can pertinently be modified within a range where the skilled person can design.

INDUSTRIAL APPLICABILITY

As has been explained, according to the near-field optical head of the invention, the front end portion of the head is formed in a shape of an edge where two planes intersect with each other and therefore, the mechanical strength of the head is enhanced and the reliability of the head is promoted.

Further, according to the near-field optical head of the invention, the front end portion of the head is formed in an edge shape in which at least one of the two intersecting faces is constituted by a curved face and a side where two faces intersect is provided with a curvature in a diameter direction of a medium. Preferably, the radius of curvature is set to five times or more of a bit width of the medium. Therefore, a signal in a direction orthogonal to a track does not constitute noise and an S/N ratio sufficient for practical use is provided.

Further, according to the near-field optical head of the invention, one of the two faces forming the edge constitutes a bottom face of a slider and accordingly, there is no need of matching heights of a tip and a slider as in the case of forming the tip at the slider. Further, a sharpening process is dispensed with, the edge portion can be formed by etching and therefore, fabrication thereof is facilitated.

Further, according to the near-field optical head of the invention, the light detecting element is arranged at an upper portion of the head and accordingly, the head becomes compact.

Further, according to the near-field optical head of the invention, the light detecting element is provided at a vicinity of the head in the slider having the head and therefore, the head becomes compact and the light detecting efficiency of scattered light is improved.

Further, according to the near-field optical head of the invention, the guide path is provided at a vicinity of the head in the slider having the head, the light detecting element is provided at the waveguide path and therefore, only scattered light from the edge can selectively be guided to the light detecting element and therefore, the S/N ratio is improved.

Further, according to the near-field optical head of the invention, the metal film is provided over the entire or at a portion of the bottom face of the slider and the edge portion is formed by the metal film. Light can be reflected at the bottom face of the slider and therefore, stray light can be reduced. Further, the edge is formed by the metal film and accordingly, the scattering efficiency is improved.

Further, according to the near-field optical head of the invention, the slider having the head is constituted by a material having transparency, the light source is arranged on the side of the slider relative to a medium and accordingly, the entire apparatus becomes compact.

Further, according to the near-field optical head of the invention, the slider having the head is constituted by a material having transparency, the light source is provided at the slider and accordingly, the constitution can be made compact. Further, the near-field optical head is suitable for mass production.

Further, according to the near-field optical head of the invention, the slider having the head is provided with the light source and the waveguide path for transmitting light of the light source and accordingly, stray light entering the light detecting element can be reduced and therefore, the S/N ratio is improved.

What is claimed is:

1. A near-field optical head for reproducing information recorded on a recording medium, comprising: an optical head having a tip end having an edge portion defined by two planes intersecting with each other, such that information recorded on the recording medium can be reproduced in accordance with an intensity of scattered light of an evanescent field generated when the recording medium is illuminated with light and the tip end of the optical head is brought proximate the recording medium at an interval equal to or smaller than a wavelength of light therebetween.

2. A near-field optical head for reproducing information recorded on a recording medium, comprising: an optical head having a tip end having an edge portion defined by two planes intersecting with each other, a side of the edge portion having a preselected radius of curvature, such that information recorded on the recording medium can be reproduced in accordance with an intensity of scattered light of an evanescent field generated when the recording medium is illuminated with light and the tip end of the optical head is brought proximate the recording medium at an interval equal to or smaller than a wavelength of light therebetween.

3. A near-field optical head for reproducing information recorded on a recording medium, comprising: an optical head having a tip end having an edge portion defined by two planes intersecting with each other, a side of the edge portion having a preselected radius of curvature having a maximum at the point of intersection between the two planes, such that information recorded on the recording medium can be reproduced in accordance with an intensity of scattered light of an evanescent field generated when the recording medium is illuminated with light and the tip end of the optical head is brought proximate the recording medium at an interval equal to or smaller than a wavelength of light therebetween.

4. A near-field optical head for reproducing information recorded on a recording medium, comprising: an optical head having a tip end having an edge portion defined by two surfaces intersecting with each other, a side of the edge portion having a preselected radius of curvature, and at least one of the intersecting surfaces being a curved surface, such that information recorded on the recording medium can be reproduced in accordance with an intensity of scattered light of an evanescent field generated when the recording medium is illuminated with light and the tip end of the optical head is brought proximate the recording medium at an interval equal to or smaller than a wavelength of light therebetween so that the radius of curvature of the side of the edge portion extends in a diametrical direction of the recording medium.

5. A near-field optical head according to claim 4; wherein the radius of curvature of the side of the edge portion is equal to or larger than five times a width of a bit of the medium.

6. A near-field optical head according to claim 5; further comprising a support mechanism for supporting the optical head and for bringing the optical head proximate the recording medium, a lower surface of the support mechanism defining one of the intersecting surfaces.

7. A near-field optical head according to claim 5; further comprising a light detecting element disposed at an upper portion of the optical head.

8. A near-field optical head according to claim 6; further comprising a light detecting element disposed at a vicinity of the optical head.

9. A near-field optical head according to claim 6; further comprising a waveguide path disposed at a vicinity of the optical head; and a light detecting element disposed in the waveguide path.

10. A near-field optical head according to claim 9; further comprising a metal film disposed over the entire or at a portion of a lower face of the support mechanism.

11. A near-field optical head according to in claim 10; wherein the support mechanism is comprised of a transparent material; and further comprising a light source disposed on the support mechanism.

12. A near-field optical head according to claim 6; wherein the support mechanism is comprised of a transparent material; and further comprising a light source disposed on the support mechanism.

13. A near-field optical head according to claim 12; further comprising a light source and a waveguide path for transmitting light emitted by the light source disposed on the support mechanism.

14. A near-field optical head according to claim 1; further comprising a support mechanism for supporting the optical head and for bringing the optical head proximate the recording medium, a lower surface of the support mechanism defining one of the intersecting surfaces.

15. A near-field optical head according to claim 14; further comprising a light detecting element disposed at a vicinity of the optical head.

16. A near-field optical head according to claim 14; further comprising a waveguide path disposed at a vicinity of the optical head; and a light detecting element disposed in the waveguide path.

17. A near-field optical head according to claim 14; further comprising a metal film disposed over the entire or at a portion of the lower face of the support mechanism.

18. A near-field optical head according to claim 1; further comprising a light detecting element disposed at an upper portion of the optical head.

19. A near-field optical head according to claim 2; further comprising a support mechanism for supporting the optical head and for bringing the optical head proximate the recording medium, a lower surface of the support mechanism defining one of the intersecting surfaces.

20. A near-field optical head according to claim 19; further comprising a light detecting element disposed at a vicinity of the optical head.

21. A near-field optical head according to claim 19; further comprising a waveguide path disposed at a vicinity of the optical head; and a light detecting element disposed in the waveguide path.

22. A near-field optical head according to claim 19; further comprising a metal film disposed over the entire or at a portion of the lower face of the support mechanism.

23. A near-field optical head according to claim 2; further comprising a light detecting element disposed at an upper portion of the optical head.

24. A near-field optical head according to claim 3; further comprising a support mechanism for supporting the optical head and for bringing the optical head proximate the recording medium, a lower surface of the support mechanism defining one of the intersecting surfaces.

25. A near-field optical head according to claim 24; further comprising a light detecting element disposed at a vicinity of the optical head.

26. A near-field optical head according to claim 24; further comprising a waveguide path disposed at a vicinity of the optical head; and a light detecting element disposed in the waveguide path.

27. A near-field optical head according to claim 24; further comprising a metal film disposed over the entire or at a portion of the lower face of the support mechanism.

28. A near-field optical head according to claim 3; further comprising a light detecting element disposed at an upper portion of the optical head.

29. A near-field optical head according to claim 4; further comprising a support mechanism for supporting the optical head and for bringing the optical head proximate the recording medium, a lower surface of the support mechanism defining one of the intersecting surfaces.

30. A near-field optical head according to claim 29; further comprising a light detecting element disposed at a vicinity of the optical head.

31. A near-field optical head according to claim 29; further comprising a waveguide path disposed at a vicinity of the optical head; and a light detecting element disposed in the waveguide path.

32. A near-field optical head according to claim 29; further comprising a metal film disposed over the entire or at a portion of the lower face of the support mechanism.

33. A near-field optical head according to claim 4; further comprising a light detecting element disposed at an upper portion of the optical head.

34. A near-field optical head according to claim 9; further comprising a metal film disposed over the entire or at a portion of the lower surface of the support mechanism.

35. A near-field optical head according to claim 1; further comprising a waveguide path disposed at the tip end of the optical head for propagating the scattered light; and a light detecting element for receiving the scattered light propagated by the waveguide path.

36. A near-field optical head according to claim 2; further comprising a waveguide path disposed at the tip end of the optical head for propagating the scattered light; and a light detecting element for receiving the scattered light propagated by the waveguide path.

37. A near-field optical head according to claim 3; further comprising a waveguide path disposed at the tip end of the optical head for propagating the scattered light; and a light detecting element for receiving the scattered light propagated by the waveguide path.

38. A near-field optical head according to claim 4; further comprising a waveguide path disposed at the tip end of the optical head for propagating the scattered light; and a light detecting element for receiving the scattered light propagated by the waveguide path.

39. A near-field optical head for reproducing information recorded on a recording medium, the near-field optical head comprising: an optical head having a tip end having an edge portion defined by two planes intersecting with each other; a support mechanism for supporting the optical head and for bringing the optical head proximate a recording medium, a surface of the support mechanism defining one of the intersecting planes; and a metal film disposed over the entire or at a portion of the surface of the support mechanism.

40. A near-field optical head for reproducing information recorded on a recording medium, the near-field optical head comprising: an optical head having a tip end having an edge portion defined by two surfaces intersecting with each other, a side of the edge portion having a preselected radius of curvature equal to or larger than five times a width of a bit of a recording medium, and at least one of the intersecting surfaces being a curved surface.

41. In combination with a light source for illuminating a recording medium with light, a near-field optical head for reproducing information recorded on the recording medium, the near-field optical head comprising: an optical head having a tip end having an edge portion defined by two planes intersecting with each other; and a support mechanism for supporting the optical head and for bringing the tip end of the optical head proximate the recording medium at an interval equal to or smaller than a wavelength of light therebetween so that information recorded on the recording medium can be reproduced in accordance with an intensity of scattered light of an evanescent field generated when the recording medium is illuminated with light by the light source.

42. A combination according to claim 41; further comprising a waveguide path disposed at the tip end of the optical head for propagating the scattered light.

43. A combination according to claim 42; further comprising a light detecting element disposed at the tip end of the optical head for receiving the scattered light propagated by the waveguide path.

44. A combination according to claim 41; wherein the support mechanism has a surface defining one of the intersecting planes; and further comprising a metal film disposed over the entire or at a portion of the surface of the support mechanism.

45. A combination according to claim 41; wherein a side of the edge portion of the tip end of the optical head has a radius of curvature equal to or larger than five times a width of a bit of the recording medium.

* * * * *